UNITED STATES PATENT OFFICE.

CHARLES O. WATKINS, OF MORIAH, NEW YORK, ASSIGNOR OF ONE-HALF TO CHARLES GARVEY, OF CROWNPOINT, NEW YORK.

COMPOSITION OF MATTER FOR THE MANUFACTURE OF GOLF-BALLS, &c.

SPECIFICATION forming part of Letters Patent No. 715,186, dated December 2, 1902.

Application filed July 18, 1902. Serial No. 116,123. (No specimens.)

*To all whom it may concern:*

Be it known that I, CHARLES O. WATKINS, a citizen of the United States, residing at Moriah, in the county of Essex and State of New York, have invented a new and useful Composition of Matter to be Used for the Manufacture of Golf-Balls, Belting, Wheel-Tires, Steam-Pipe Packing, Bicycle-Handles, and other Useful Articles, of which the following is a specification.

My composition consists of the following ingredients, combined in the proportions stated, viz: commercial dry spruce-yellow paint-powder or yellow ocher, or in place thereof commercial whiting or refined ground clay or kaolin powder or any one of the ground mineral ochers in the form of dry powder and of any colors as found or prepared, five pounds; dry peat or peat-moss powder, (preferably peat-moss powder,) three pounds; commercial gasolene, sixteen pounds; crude india-rubber, (caoutchouc,) four pounds.

The process of manufacture is as follows, viz: The rubber is cut into thin slices and placed, with the gasolene, in an air-tight vessel to dissolve, and this mixture is allowed to stand twenty-four hours, when the mass becomes a jelly. The peat or peat-moss powder and the spruce-yellow paint-powder or one of its substitutes, as aforesaid, are thoroughly mixed together in a dry state, and this batch of mixed powder is then mixed and kneaded together with the dissolved rubber or jelly into a dough, which dough is continued to be worked and kneaded together by the hands or with machinery until the mass of dough reaches a consistency and firmness so that it ceases to adhere to the hands or machinery working or kneading the same. In this state it is then molded into any form required, or it can be run through rollers and under pressure formed into a tissue or to any thickness or form required. The kneading and working of the dough causes the evaporation of the bulk of the gasolene, the same being worked and kneaded in the open air, and after the different articles are formed or molded they are laid aside to dry, so that full evaporation of the gasolene will take place, and when it is fully evaporated it leaves the articles dry, firm, and ready for use; but in the manufacture of belting or other articles where this composition is required to adhere to other substances the composition is applied thereto while the dough is in a green and sticky state, before the full evaporation of the gasolene takes place—for instance, where this composition is used for coating canvas to be used as belting or otherwise.

What I claim, and desire to secure by Letters Patent of the United States, is—

1. The herein-described composition of matter consisting of commercial dry spruce-yellow or yellow ocher, dry peat or peat-moss powder, crude india-rubber or caoutchouc and commercial gasolene, substantially as described.

2. The herein-described composition of matter for the manufacture of golf-balls, belting, wheel-tires, steam-pipe packing, bicycle-handles and other useful articles consisting of commercial dry spruce-yellow paint-powder in the proportion of five pounds, dry peat or peat-moss powder three pounds, commercial gasolene sixteen pounds and crude india-rubber or caoutchouc four pounds, substantially as described.

In testimony whereof I have signed my name to this specification, in the presence of two subscribing witnesses, July 5, 1902.

CHARLES O. WATKINS.

Witnesses:
C. M. PUTNAM,
ELOISE SURPRENANT.